United States Patent
Lemmers, Jr. et al.

(10) Patent No.: US 11,038,403 B2
(45) Date of Patent: Jun. 15, 2021

(54) ROTARY ELECTRIC MACHINES AND METHODS OF COOLING ROTARY ELECTRIC MACHINES

(71) Applicant: Hamilton Sundstrand Corporation, Charlotte, NC (US)

(72) Inventors: Glenn C. Lemmers, Jr., Loves Park, IL (US); Brady A. Manogue, Beloit, WI (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 139 days.

(21) Appl. No.: 16/355,350

(22) Filed: Mar. 15, 2019

(65) Prior Publication Data
US 2020/0295625 A1 Sep. 17, 2020

(51) Int. Cl.
| H02K 9/19 | (2006.01) |
|---|---|
| H02K 11/00 | (2016.01) |
| B64D 27/24 | (2006.01) |
| B64D 33/08 | (2006.01) |
| H02K 3/04 | (2006.01) |
| H02K 7/00 | (2006.01) |
| H02K 11/04 | (2016.01) |

(52) U.S. Cl.
CPC .............. *H02K 9/19* (2013.01); *B64D 27/24* (2013.01); *B64D 33/08* (2013.01); *H02K 3/04* (2013.01); *H02K 7/003* (2013.01); *H02K 11/046* (2013.01)

(58) Field of Classification Search
CPC ............ H02K 9/19; H02K 3/04; H02K 7/003; H02K 11/046; H02K 19/38; H02K 9/197; H02K 1/32; B64D 27/24; B64D 33/08

USPC ....................................................... 310/54, 61
See application file for complete search history.

(56) References Cited

U.S. PATENT DOCUMENTS

| 2,897,383 | A | | 7/1959 | Barrows et al. | |
|---|---|---|---|---|---|
| 3,562,564 | A | * | 2/1971 | Potter | H02K 19/34 310/54 |
| 5,189,325 | A | | 2/1993 | Jarczynski | |
| 5,237,227 | A | * | 8/1993 | Huss | H02K 9/197 310/54 |
| 8,138,642 | B2 | | 3/2012 | Lemmers, Jr. et al. | |
| 9,812,917 | B2 | | 11/2017 | Himmelmann | |
| 2018/0278127 | A1 | * | 9/2018 | Huang | H02K 3/24 |

OTHER PUBLICATIONS

European Search Report for Application No. 19210206.9, dated Jul. 3, 2020, 19 pages.

* cited by examiner

Primary Examiner — Thomas Truong
(74) Attorney, Agent, or Firm — Cantor Colburn LLP

(57) ABSTRACT

A rotary electric machine includes a stator with a stator winding, a rotor with a field winding supported for rotation about a rotation axis relative to the stator, and an excitation winding. The excitation winding is fixed relative to the rotor and is electrically connected to the field winding. The rotor defines a coolant channel having an inlet and an outlet. Liquid coolant enters the inlet and flows outwardly through a portion of the excitation winding to conduct heat away from the excitation winding. Generators, aircraft electrical systems, and methods of cooling rotary electric machines are also described.

13 Claims, 4 Drawing Sheets

ROTARY ELECTRIC MACHINES AND METHODS OF COOLING ROTARY ELECTRIC MACHINES

BACKGROUND

The subject matter disclosed herein generally relates to rotary electric machines, and more particularly to cooling rotary electric machines like generators.

Rotary electric machines include generators and motors. Motors convert electrical energy into mechanical energy. Generators convert mechanical energy into electrical energy using a magnetic device supported for rotation relative to a stationary winding. As the magnetic device rotates relative to a stationary winding the magnetic device induces a flow of current in the stationary winding.

When high power density is required the magnetic device generally includes rotor windings. The rotor windings are supplied an excitation current which, as the excitation current traverses the rotor windings, current generates a magnetic field in strength corresponding to the magnitude of the excitation current. Since the excitation current generates heat in the rotor winding corresponding to the magnitude of the excitation current, some generators employ cooling to provide greater output power than otherwise capable with a given size rotor winding. The cooling is typically by spraying a liquid coolant on the end of the rotor to cool the rotor winding while limiting the efficiency losses that can result when coolant infiltrates the gap defined between the rotor and stator of the generator.

Such systems and methods have generally been acceptable for their intended purpose. However, there remains a need in the art for improved rotary electric machines, generators, and methods of removing heat from rotary electric machines. The present disclosure provides a solution to this need.

BRIEF SUMMARY

In certain embodiments a rotary electric machine is provided. The rotary electric machine includes a stator with a stator winding, a rotor with a field winding supported for rotation about a rotation axis relative to the stator, the rotor defining a coolant channel having an inlet and an outlet, and an excitation winding. The excitation winding is fixed relative to the rotor and electrically connected to the field winding. Liquid coolant that enters the inlet flows outwardly through a portion of the excitation winding to conduct heat away from the excitation winding.

In addition to one or more of the features described above, or as an alternative, further embodiments may include wherein the rotor comprises a shaft arranged along the rotation axis, the shaft defining the inlet.

In addition to one or more of the features described above, or as an alternative, further embodiments may include wherein the rotary electric machine includes a liquid coolant source in fluid communication with the inlet.

In addition to one or more of the features described above, or as an alternative, further embodiments may include wherein the shaft has a wall bounding a hollow interior with a feed aperture extending radially therethrough, the inlet in fluid communication with the excitation winding through the hollow interior and the feed aperture of the shaft.

In addition to one or more of the features described above, or as an alternative, further embodiments may include wherein the rotor includes a rotor core supporting the excitation winding and the field winding, the coolant channel extending through the rotor core.

In addition to one or more of the features described above, or as an alternative, further embodiments may include wherein the rotor core defines a coolant channel radially inner segment extending between the rotation axis and the excitation winding, the radially inner channel segment fluidly terminating at the excitation winding.

In addition to one or more of the features described above, or as an alternative, further embodiments may include wherein the rotor core defines a coolant channel radially outer segment extending between the excitation winding and the field winding, the excitation winding fluidly interposed between the radially outer segment and the rotation axis.

In addition to one or more of the features described above, or as an alternative, further embodiments may include wherein the rotor core defines a coolant channel axial segment extending along the field winding, the axial segment fluidly coupling the excitation winding to the outlet.

In addition to one or more of the features described above, or as an alternative, further embodiments may include that the rotary electric machine includes a rotating rectifier arranged radially between the excitation winding and the rotation axis, wherein the coolant channel extends fluidly through the rotating rectifier.

In addition to one or more of the features described above, or as an alternative, further embodiments may include wherein the rotor comprises an end plate fixed in rotation relative to rotor, the end plate arranged axially between the excitation winding and the field winding.

In addition to one or more of the features described above, or as an alternative, further embodiments may include wherein the end plate defines a coolant channel radially inner segment extending between the rotation axis and the excitation winding, the radially inner channel of the coolant channel segment fluidly terminating at the excitation winding.

In addition to one or more of the features described above, or as an alternative, further embodiments may include wherein the end plate defines a radially outer segment extending between the excitation winding and the field winding, the excitation winding fluidly interposed between the radially outer segment of the coolant channel and the rotation axis.

In addition to one or more of the features described above, or as an alternative, further embodiments may include wherein the radially outer segment of the coolant channel extends at least partially about the rotation axis with a circumferential component.

In addition to one or more of the features described above, or as an alternative, further embodiments may include wherein an end turn of the excitation winding is fixed within the end turn pocket, the end turn pocket fluidly coupling the excitation winding end turn to the coolant channel.

In certain embodiments a generator is provided. The generator includes a stator having a stator winding, a rotor with a field winding supported for rotation about a rotation axis relative to the stator, the rotor defining a coolant channel having an inlet and an outlet, and an excitation winding. The excitation winding has an end turn fixed relative to the rotor and electrically connected to the field winding. A rotating rectifier is arranged radially between the excitation winding and the rotation axis, wherein the coolant channel extends fluidly through the rotating rectifier, liquid coolant entering the inlet flowing outwardly through the end turn of the excitation winding to conduct heat away from the excitation winding.

In addition to one or more of the features described above, or as an alternative, further embodiments may include wherein the rotor comprises a rotor core supporting the excitation winding and the field winding, the coolant channel extending through the rotor core; wherein the rotor core defines a coolant channel radially inner segment extending between the rotation axis and the excitation winding, the radially inner channel segment fluidly terminating at the excitation winding; wherein the rotor core defines a coolant channel radially outer segment extending between the excitation winding and the field winding, the excitation winding fluidly interposed between the radially outer segment and the rotation axis; and wherein the rotor core defines a coolant channel axial segment extending along the field winding, the axial segment fluidly coupling the excitation winding to the outlet of the coolant channel.

In addition to one or more of the features described above, or as an alternative, further embodiments may include wherein the rotor comprises an end plate fixed in rotation relative to rotor, the end plate arranged axially between the excitation winding and the field winding; wherein the end plate defines a coolant channel radially inner segment extending between the rotation axis and the excitation winding, the radially inner channel of the coolant channel segment fluidly terminating at the excitation winding; and wherein the end plate defines a radially outer segment extending between the excitation winding and the field winding, the excitation winding fluidly interposed between the radially outer segment of the coolant channel and the rotation axis.

In further embodiments an aircraft electrical system is provided. The aircraft electrical system includes a generator as described above wherein the rotor comprises a shaft arranged along the rotation axis and the shaft defining the inlet of the coolant channel, an electrical load connected to the stator winding, and a liquid coolant source in fluid communication with the coolant channel through the inlet of the coolant channel.

In certain embodiments a method of cooling a rotary electric machine is provided. The method includes, at a rotary electric machine as described above, introducing a liquid coolant into the inlet of the coolant channel; flowing the liquid coolant radially outward and across an end turn of the excitation winding; and conducting heat from the excitation winding to the liquid coolant through the end turn of the excitation winding.

In addition to one or more of the features described above, or as an alternative, further embodiments of the method may include flowing the liquid coolant through a rotating rectifier fixed in rotation relative to the rotor, and flowing the liquid coolant axially along the rotor to the outlet of the coolant channel at an end of the rotor opposite the excitation winding.

Technical effects of the present disclosure include improved efficiency by limiting (or eliminating entirely) coolant infiltration into the windage gap between the rotor and stator in rotary electric machines. In certain embodiments the need for spray cooling of excitation winding end turns is limited (or eliminated entirely) in rotary electrical machines operating at ratings otherwise requiring spray cooling. In accordance with certain embodiments viscous searing of lubricant within the windage gap is limited (or eliminated entirely) due to heat removal through conduction at the rotor end plate.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
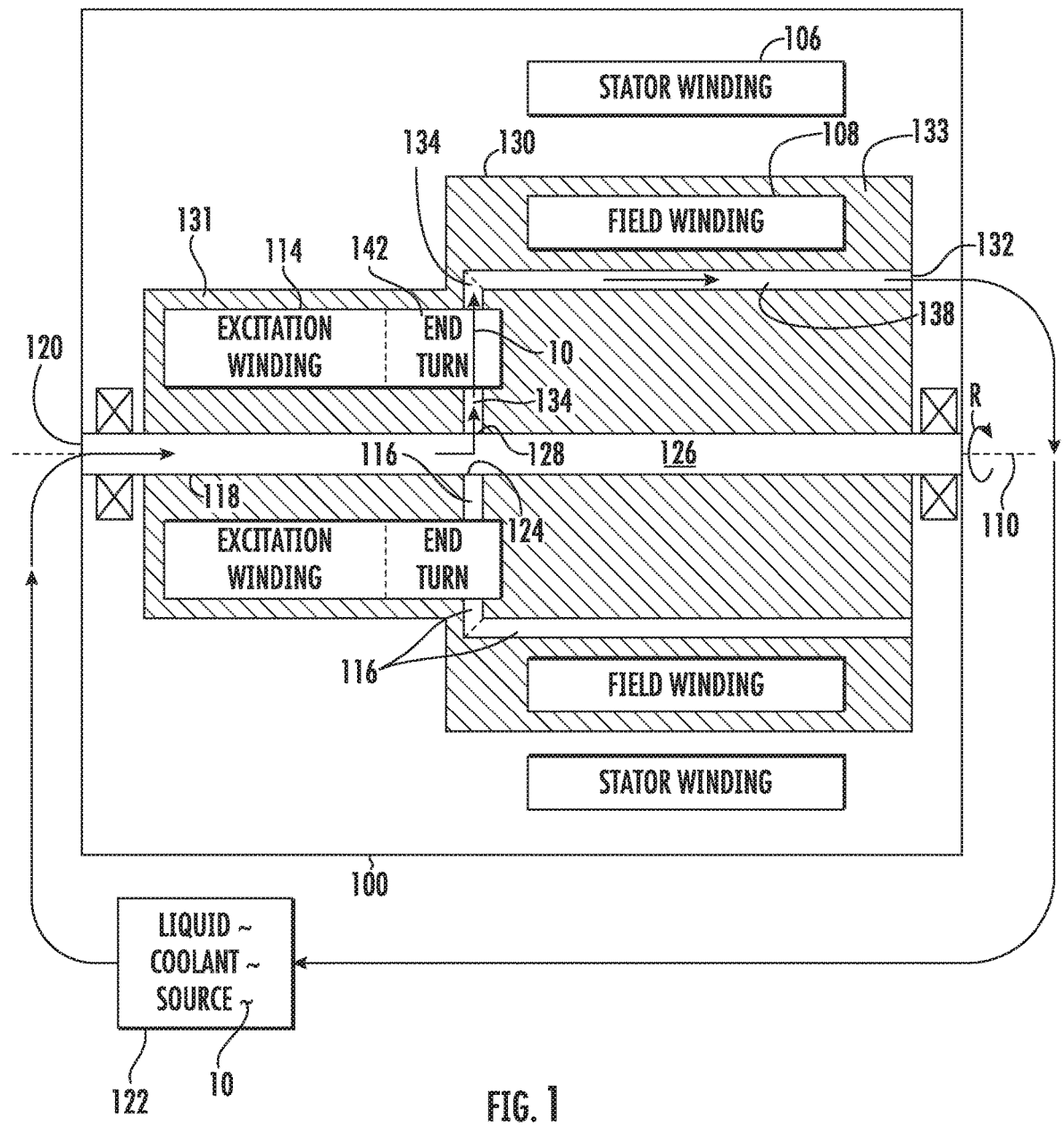
FIG. 1 is a schematic view of a rotary electric machine constructed in accordance with the present disclosure, showing a liquid coolant source providing a flow of liquid coolant to a rotor of the rotary electric machine for conducting heat from excitation windings carried by the rotor.

Reference will now be made to the drawings wherein like reference numerals identify similar structural features or aspects of the subject disclosure. For purposes of explanation and illustration, and not limitation, a partial view of an exemplary embodiment of a rotary electrical machine constructed system in accordance with the disclosure is shown in FIG. 1 and is designated generally by reference character 100. Other embodiments of rotary electrical machines, generators, and methods of removing heat from rotary electrical machines in accordance with the present disclosure, or aspects thereof, are provided in FIGS. 2-4, as will be described. The systems and methods described herein can be used for removing heat from excitation windings in rotary electrical machines, such as generator-type rotary electrical machines used to provide power in aircraft electrical systems, though the present disclosure is not limited to aircraft electrical machines or to generator-type electrical machines in general.

Referring to FIG. 1, the rotary electric machine 100 is shown. The rotary electric machine 100 includes a stator 102 and a rotor 104. The stator 102 has stator winding 106. The rotor 104 has a field winding 108 and is supported for rotation R about a rotation axis 110 relative to the stator 102, e.g., by a bearing arrangement 112. An excitation winding 114 is fixed relative to the rotor 104 and is electrically connected to the field winding 106. The rotor 104 defines a coolant channel 116 which is in fluid communication with the excitation winding 114 to conduct heat H from the excitation winding by flowing a liquid coolant 10 traversing the coolant channel 116 across the excitation winding 114.

The rotor 104 of the rotary electric machine 100 includes a shaft 118 and a rotor core 130. The shaft 118 is arranged along the rotation along the rotation axis 110 and defines an inlet 120, e.g., a liquid coolant inlet. The inlet 120 is in fluid communication with the coolant channel 116 for providing the liquid coolant 10 to the coolant channel 116. The liquid coolant 10 is in turn provided to the rotary electric machine 100 by a liquid coolant source 122, which is in fluid communication with the inlet 120, and therethrough with the coolant channel 116, to provide the liquid coolant 10 to the rotary electric machine 100. Examples of suitable liquid coolants include oil, and dielectric liquids by non-limiting example.

The shaft 118 has a wall 124 and is hollow. In this respect the wall 124 extends about a hollow interior 126 of the shaft 118 and defines therethrough a feed aperture 128. The feed aperture 126 extends radially through the wall 124 and is in fluid communication with inlet 120 through the hollowing interior 126 of the shaft 118. More specifically, the inlet 120 is in fluid communication with the excitation winding 114 through the hollow interior 126 and the feed aperture defined by the wall 124 of the shaft 118.

The rotor core 130 is fixed in rotation relative to the shaft 118 and supports both the excitation winding 114 and the field winding 108. In certain embodiments a unitary rotor core 130 carries the excitation winding 114 and the field winding 108. In accordance with certain embodiments, the rotor core 130 can be a first core 130 and a second core 131, fixed relative to the first rotor core 130, can carry the field winding 108. As shown in FIG. 1 the excitation winding 114 is axially offset from the field winding 108 along the rotation axis 110. In this respect the excitation winding 114 is arranged axially along the rotation axis 110 between the inlet 120 and the field winding. Further, an outlet 132, e.g., a liquid coolant outlet, is arranged on an end of the rotor core 130 on a side of the field winding 108 axially opposite the excitation winding 114 and radially outward of the inlet 120. The outlet 132 is in fluid communication with the inlet 120 through the coolant channel 116, which extends through the rotor core 130. In certain embodiments this allows the liquid coolant 10 to traverse the coolant channel 116, and more particularly the rotor core 130, without entering a gap defined between the rotor 104 and the stator 102. As will be appreciated, this limits windage losses during operation of the rotary electric machine 100.

The coolant channel 116 includes a plurality of coolant channel segments interconnected with one another serially to form a coolant path through the rotor core 130. In this respect the rotor core defines a coolant channel radially inner segment 134, a coolant channel radially outer segment 136, a coolant channel axial segment 138, and an end turn pocket 140. The coolant channel radially inner segment 134 extends through the rotor core 130 between the rotation axis 110 and the excitation winding 114, the coolant channel radially inner segment 134 terminating at the excitation winding 114. More specifically, the coolant channel radially inner segment 134 terminates at the end turn pocket 140, wherein an end turn 142 of the excitation winding 114 is positioned (e.g., fixed) such that the liquid coolant 10 can flow thereacross to conduct heat H from the excitation winding 114.

The coolant channel radially outer segment 136 extends radially between the excitation winding 114 and the field winding 108 such that the excitation winding 114 fluidly interposed between the coolant channel radially outer segment 136 and the coolant channel radially outer segment 136. In this respect the coolant channel radially outer segment 136 fluidly connects the end turn pocket 140 to the coolant channel axial segment 138 to introduce the liquid coolant 10, heated by heat H conducted from the excitation winding 114, to the coolant channel axial segment 138. The coolant channel axial segment 138 extends axially along the field winding 108, e.g., at a radially inward position radially opposite the gap between the rotor 104 and the stator 102, and fluidly couples the excitation winding 114 to the outlet 132.

Figure 2:
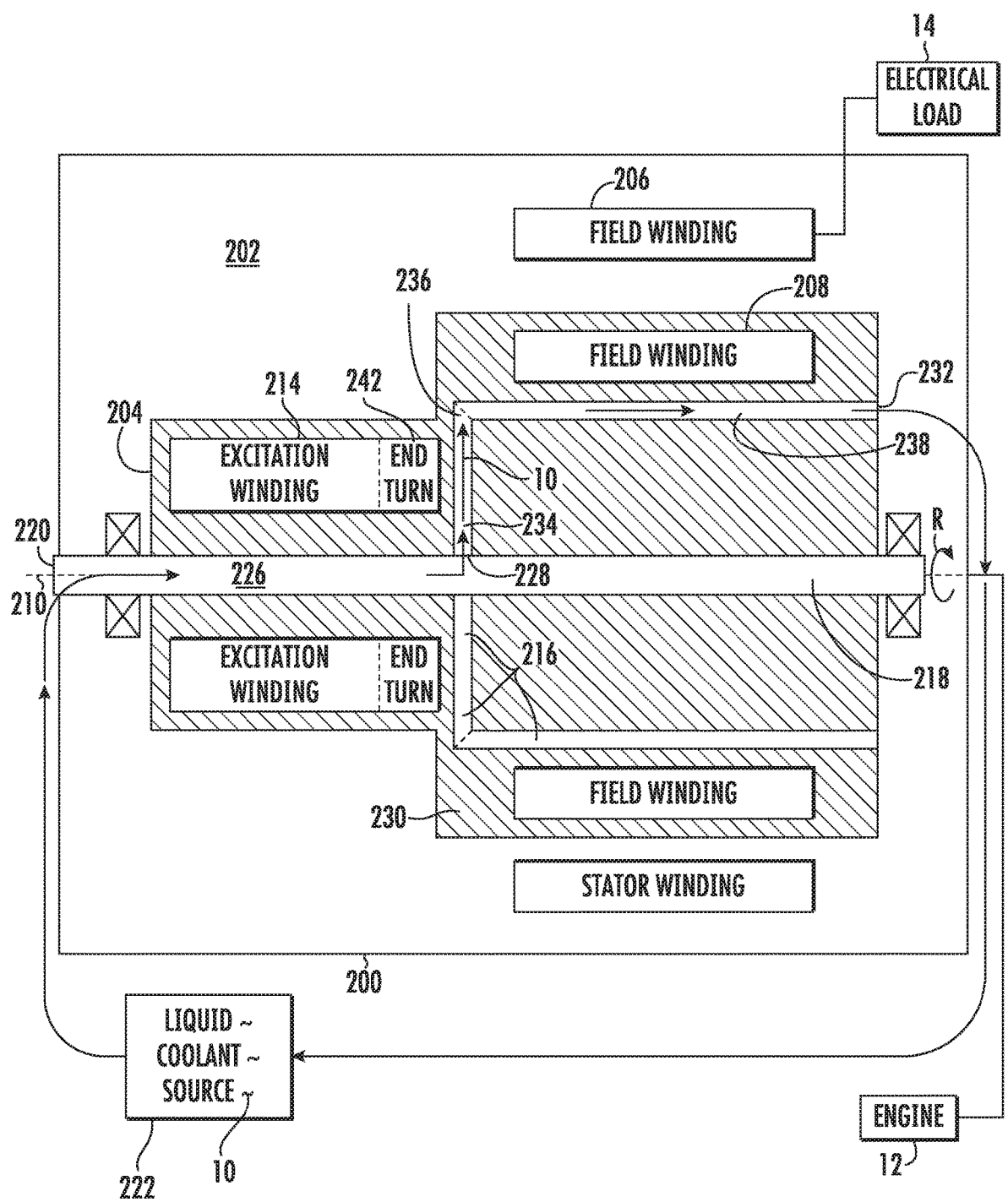
FIG. 2 is schematic view of an aircraft electrical system including the rotary electric machine of FIG. 1, showing a generator-type rotary electric machine with a liquid cooled excitation winding providing electrical power to an electrical load.

With reference to FIG. 2, a rotary electric machine 200 is shown. The rotary electric machine 200 is similar to the rotary electric machine 100 (shown in FIG. 1) and is additionally arranged as a generator-type rotary electric machine. In this respect the rotary electric machine 200 includes a stator 202 having a stator winding 206, a rotor 204 supported for rotation about a rotation axis 210 with a field winding 208 and an excitation winding 214, and a rotor core 230 seated on a rotor shaft 218. A rotating rectifier 244 is carried by the rotor 204, the rotating rectifier 244 arranged radially between the rotation axis 210 and the excitation winding 214 to provide a flow of excitation current from the excitation winding 214 to the field winding 208. An engine 12, e.g., an aircraft main engine or an auxiliary power unit, is operably connected to the shaft 218 to rotate the rotor 204 about the rotation axis 210. Rotation R of the rotor 204 about the rotation axis 210 induces current flow in the stator winding 206, which is harvested to provide a flow of electrical power P to an electric load 14 connected to the stator winding 206.

The rotor 204 includes a rotating rectifier 244 and defines a coolant channel 216 extending through the rotor 204. In this respect liquid coolant 10 entering an inlet 220 defined by the shaft 218 flows into rotating rectifier 244 through a feed aperture 228 extending through a wall 224 of the shaft 218. The liquid coolant 10 traverses the rotating rectifier 244, removing heat from electrical elements of the rotating rectifier 244, and enters a coolant channel radially inner segment 234. The coolant channel radially inner segment 234 provides the coolant to an end turn pocket 240 wherein an end turn 242 of the excitation winding 214 is positioned, the liquid coolant 10 flowing across the end turn 242 and conducting heat H from the excitation winding 214. The liquid coolant 10 thereafter flows through a coolant channel radially outer segment 236 and a coolant channel axial segment 238 to remove further heat from the rotor 204, and thereafter returns to the liquid coolant source 222 for return to the rotary electric machine 200.

Figure 3:
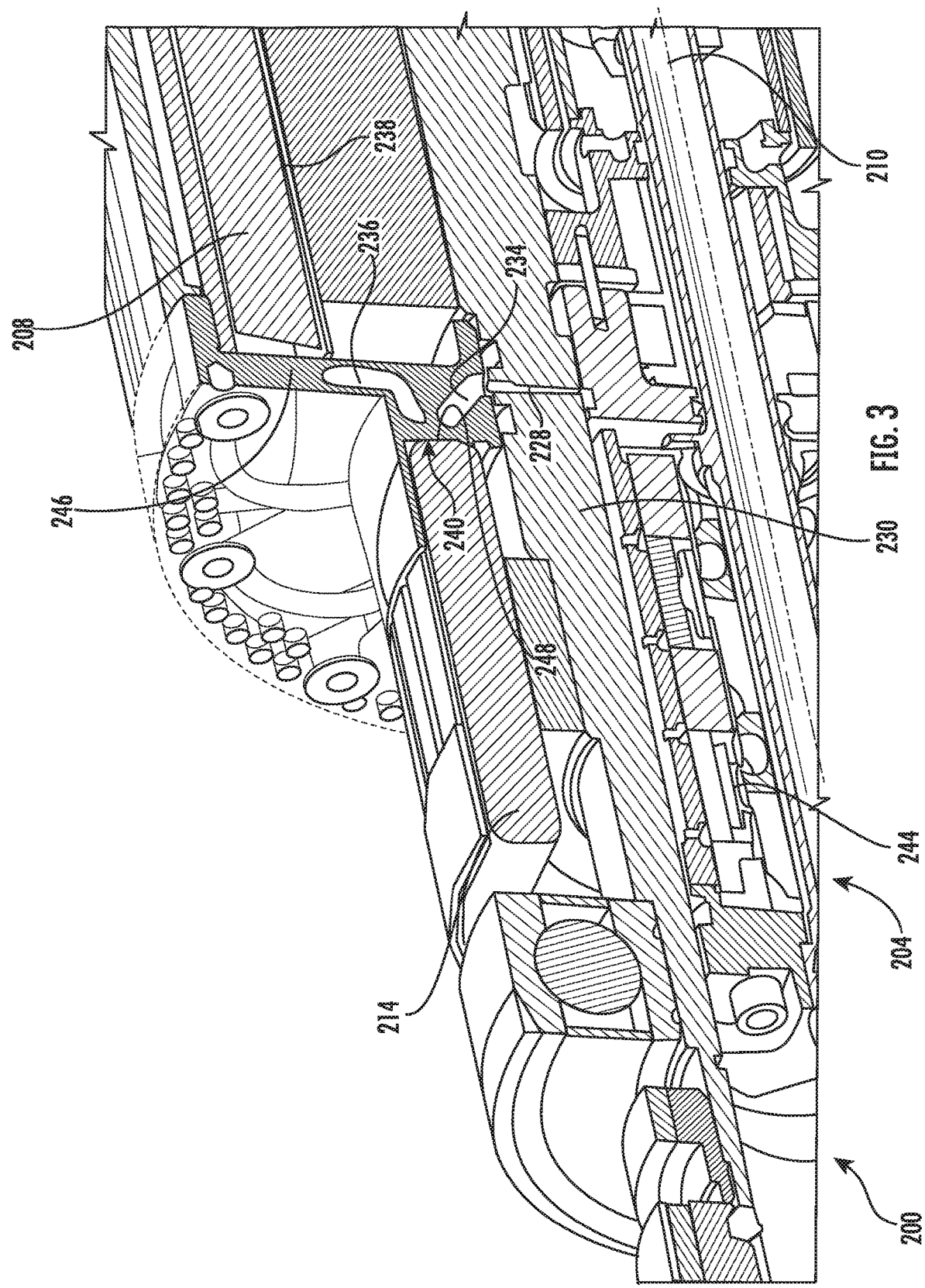
FIG. 3 is a cross-sectional side view of a portion of the rotary electric machine of FIG. 1 according to an embodiment, showing an end plate defining a coolant channel radially inner segment coupled to a coolant channel radially outer segment by a winding pocket.

Referring now to FIG. 3, the rotary electric machine 200 is shown according to an embodiment. As shown in FIG. 3, the rotor core 230 includes an end plate 246. The end plate 246 is fixed in rotation relative to the rotor 204 and is arranged axially along the rotation axis 210 between the excitation winding 214 and the field winding 208. A coolant channel radially inner segment 234 and a coolant channel radially outer segment 236 are defined within the end plate 246 to fluid connect the rotating rectifier 244 to a coolant channel axial segment 238 defined within the rotor core 230, and therethrough to an outlet 232 (shown in FIG. 2) of the rotor 204.

The coolant channel radially inner segment 234 extends between the rotation axis 210 and the excitation winding 214 through the end plate 246 and terminates at the end turn pocket 240. The end turn pocket 240 is defined on a face 248 of the end plate 246 axially opposite the field winding 208 and can be, for example, a recess defined within the face 248 having an aperture terminating the coolant channel radially inner segment 234 and an aperture leading to the coolant channel radially outer segment 236. It is contemplated that the end turn 242 of the excitation winding 214 be fixed within the end turn pocket 240 such that coolant issuing into the end turn pocket 240 from the coolant channel radially inner segment 234 flows across the end turn 242 prior to exiting the end turn pocket 240 through the coolant channel radially outer segment 236.

The coolant channel radially outer segment 236 is defined with the end plate 246 and fluid couples the end turn pocket 240 with the coolant channel axial segment 238. More specifically, the coolant channel radially outer segment 236 extends between the excitation winding 214 and field winding 208, the excitation winding 214 being fluidly interposed between the coolant channel radially outer segment 236 and the rotation axis 210. As shown in FIG. 3, the coolant channel radially outer segment 236 can further extend at least partially about the rotation axis 210 with a circumferential component. The circumferential component of the coolant channel radially outer segment 238 allows the coolant channel radially outer segment 236 to accommodate mismatch between the number of excitation winding end turns 242 and magnetic poles 250 of the rotor 204. In certain embodiments the end plate 246 can be formed using an additive manufacturing technique, such as powder bed fusion by way of non-limiting example, to form the end plate 246 as a monolithic structure defining the coolant channel radially inner segment 234 and the coolant channel radially outer segment 236 within the interior of the end plate 246.

Figure 4:
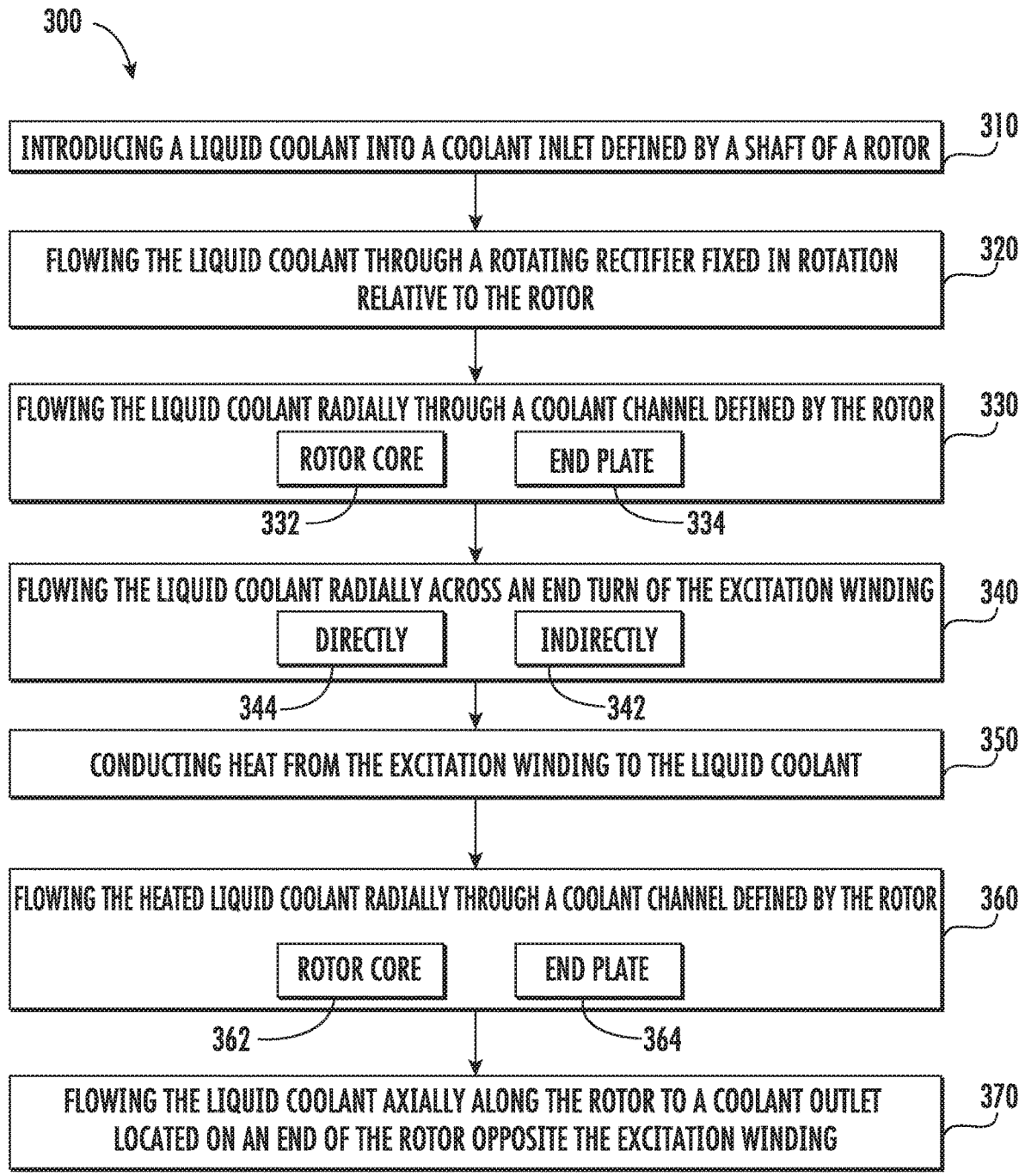
FIG. 4 is a block diagram of a method of removing heat from a rotary electrical machine, showing steps of the method.

With reference to FIG. 4, a method 300 of removing heat from a rotary electric machine, e.g., the rotary electric machine 100 (shown in FIG. 1) or the rotary electric machine 200 (shown in FIG. 2), is shown. The method 300 includes introducing a coolant, e.g., the liquid coolant 10 (shown in FIG. 1), into an inlet defined by a shaft of the rotary electric machine rotor, e.g., the inlet 120 (shown in FIG. 1) or the inlet 220 (shown in FIG. 2), as shown with box 310. The liquid coolant flows through a rotating rectifier fixed relative to the rotor, e.g., the rotating rectifier 244 (shown in FIG. 2), as shown with box 320. The liquid coolant thereafter flows through a coolant channel radially inner segment, e.g., the coolant radially inner channel segment 134 (shown in FIG. 1) or the radially inner channel segment 234 (shown in FIG. 2), defined by the rotor to an excitation winding carried by the rotor, e.g., the excitation winding 114 (shown in FIG. 1), as shown with box 330. In certain embodiments the coolant channel radially inner segment is defined by the rotor core, e.g., the rotor core 130 (shown in FIG. 1) or the rotor core 230 (shown in FIG. 2), as shown with box 332. In accordance with certain embodiments, the coolant channel can be defined by an end plate of the rotor core, e.g., the end plate 246 (shown in FIG. 3), as shown with box 334.

Once the liquid coolant reaches the excitation winding the liquid coolant issues from the coolant channel radially inner segment and flows across an end turn of the excitation winding, e.g., the end turn 142 (shown in FIG. 1) or the end turn 242 (shown in FIG. 2), as shown with box 340. As the liquid coolant flows across the excitation winding end turn the liquid coolant removes heat from the excitation winding via conduction, as shown with box 350. As shown with box 342, it is contemplated that the coolant can flow through a coolant channel indirectly in thermal communication with the winding through an intermediate section of the rotor core, the intermediate section of the rotor core communicating heat from the end turn of the excitation winding to the coolant. As shown with box 344, it also contemplated that the coolant can flow directly across the end turn of the excitation winding, the coolant conducting heat from the excitation winding as the coolant baths the end turn of the excitation winding.

Thereafter the heated liquid coolant enters a coolant channel radially outer channel segment, e.g., the coolant channel radially outer segment 136 (shown in FIG. 1) or the coolant channel radially outer channel segment 236 (shown in FIG. 2), as shown with box 362. In certain embodiments the coolant channel radially outer segment can be defined by a rotor core, e.g., the rotor core 130 (shown in FIG. 1) or the rotor core 230 (shown in FIG. 2), as shown with box 262. In accordance with certain embodiments the coolant channel radially outer segment can be defined by an end plate of the rotor, e.g., the end plate 246 (shown in FIG. 3), as shown with box 364. From the coolant channel radially outer segment the liquid coolant is provided to a coolant channel axial segment, as shown with box 370, wherein the liquid coolant removes additional heat from a field winding carried by the rotor.

Rotary electric machines commonly employ spray cooling to remove heat from windings carried by the rotor of rotary electric machine. While generally acceptable for its intended purpose, spray cooling can sometimes reduce generator efficiency due to the tendency of the liquid coolant to infiltrate the gap defined between the rotor and stator of the rotary electric machine. Once in the gap the liquid coolant can increase frictional losses in the rotary electrical machine, such as from windage. Once in the gap the liquid coolant can also be subject to searing—particularly in high speed rotary electric machines.

In embodiments liquid coolant is flowed across end turns of the excitation windings within the rotor using coolant channels defined within the interior of the rotor structure, limiting (or eliminating entirely) the likelihood of the liquid coolant to infiltrate the gap between the rotor and stator of the rotary electric machine. In accordance with certain embodiments, liquid coolant can be provided to the excitation windings by a coolant channel radially inner coolant channel segment and removed, once heated, using a coolant channel segment defined within an end plate of the rotor field windings. Upon reaching the excitation winding the coolant flows across the excitation winding end turns, removes heat from the excitation winding via the excitation winding end turn, and thereafter exits the rotor through a coolant channel radially outer segment. It is also contemplated that, in accordance with certain embodiments, the heated coolant can remove further heat from the rotary electric machine by flowing axially through the rotor along rotor field windings, the liquid coolant thereby removing additional heat from the field windings of the electric machine rotor.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotary electric machine, comprising:
    a stator with a stator winding;
    a rotor with a field winding supported for rotation about a rotation axis relative to the stator, the rotor defining a coolant channel having an inlet and an outlet; and
    an excitation winding fixed relative to the rotor and electrically connected to the field winding,
    wherein liquid coolant that enters the inlet flows outwardly through a portion of the excitation winding to conduct heat away from the excitation winding;
    wherein:
    the rotor comprises an end plate fixed in rotation relative to rotor, the end plate arranged axially between the excitation winding and the field winding;
    the end plate defines a radially outer segment extending between the excitation winding and the field winding; and
        the end plate defines, within the end plate;
        a coolant channel radially inner segment extending between the rotation axis and the excitation winding, a radially inner channel of the coolant channel segment fluidly terminating at the excitation winding; and
        a coolant channel radially outer segment extending between the excitation winding and the field winding, the excitation winding fluidly interposed between the radially outer segment and the rotation axis, wherein the coolant channel radially outer segment extends at least partially about the rotation axis with a circumferential component; and
    wherein an end turn pocket is defined on an axial face of the end plate, wherein an end turn of the excitation winding is fixed within the end turn pocket, the end turn pocket fluidly coupling the excitation winding end turn to the coolant channel radially inner and outer segments.

2. The rotary electric machine as recited in claim 1, wherein the rotor comprises a shaft arranged along the rotation axis, the shaft defining the inlet.

3. The rotary electric machine as recited in claim 2, further comprising a liquid coolant source in fluid communication with the inlet.

4. The rotary electric machine as recited in claim 2, wherein the shaft has a wall bounding a hollow interior with a feed aperture extending radially therethrough, the inlet in fluid communication with the excitation winding through the hollow interior and the feed aperture of the shaft.

5. The rotary electric machine as recited in claim 1, wherein the rotor comprises a rotor core supporting the excitation winding and the field winding, the coolant channel extending through the rotor core.

6. The rotary electric machine as recited in claim 5, wherein the rotor core defines a coolant channel radially inner segment extending between the rotation axis and the excitation winding, the radially inner channel segment fluidly terminating at the excitation winding.

7. The rotary electric machine as recited in claim 5, wherein the rotor core defines a coolant channel axial segment extending along the field winding, the axial segment fluidly coupling the excitation winding to the outlet.

8. The rotary electric machine as recited in claim 1, further comprising a rotating rectifier arranged radially between the excitation winding and the rotation axis, wherein the coolant channel extends fluidly through the rotating rectifier.

9. A generator, comprising:
    a stator having a stator winding;
    a rotor with a field winding supported for rotation about a rotation axis relative to the stator,
    the rotor defining a coolant channel having an inlet and an outlet;
    an excitation winding with an end turn fixed relative to the rotor and electrically connected to the field winding; and
    a rotating rectifier arranged radially between the excitation winding and the rotation axis,
    wherein the coolant channel extends fluidly through the rotating rectifier,
    wherein liquid coolant that enters the inlet flow outwardly through the end turn of the excitation winding to conduct heat away from the excitation winding,
    wherein:
    the rotor comprises an end plate fixed in rotation relative to rotor, the end plate arranged axially between the excitation winding and the field windings;
    the end plate defines a radially outer segment extending between the excitation winding and the field winding; and
        the end plate defines, within the end plate;
        a coolant channel radially inner segment extending between the rotation axis and the excitation winding, a radially inner channel of the coolant channel segment fluidly terminating at the excitation winding; and
        a coolant channel radially outer segment extending between the excitation winding and the field winding, the excitation winding fluidly interposed between the radially outer segment and the rotation axis, wherein the coolant channel radially outer segment extends at least partially about the rotation axis with a circumferential component; and
    wherein an end turn pocket is defined on an axial face of the end plate, wherein an end turn of the excitation winding is fixed within the end turn pocket, the end turn pocket fluidly coupling the excitation winding end turn to the coolant channel radially inner and outer segments.

10. The generator as recited in claim 9, wherein
    the rotor comprises a rotor core supporting the excitation winding and the field winding, the coolant channel extending through the rotor core;
    wherein the rotor core defines a coolant channel radially inner segment extending between the rotation axis and the excitation winding, the radially inner channel segment fluidly terminating at the excitation winding;

wherein the rotor core defines a coolant channel radially outer segment extending between the excitation winding and the field winding, the excitation winding fluidly interposed between the radially outer segment and the rotation axis; and wherein the rotor core defines a coolant channel axial segment extending along the field winding, the axial segment fluidly coupling the excitation winding to the outlet of the coolant channel.

11. An aircraft electrical system, comprising:

a generator as recited in claim 9, wherein the rotor comprises a shaft arranged along the rotation axis, the shaft defining the inlet of the coolant channel;

an electrical load connected to the stator winding; and a liquid coolant source in fluid communication with the coolant channel through the inlet of the coolant channel.

12. A method of cooling a rotary electrical machine, comprising:

at a rotary electrical machine that includes:
  a stator with a stator winding,
  a rotor with a field winding supported for rotation about a rotation axis relative to the stator, the rotor defining a coolant channel having an inlet and an outlet; and
  an excitation winding fixed relative to the rotor and electrically connected to the field winding,
  wherein:
    the rotor comprises an end plate fixed in rotation relative to rotor, the end plate arranged axially between the excitation winding and the field windings;
    the end plate defines a radially outer segment extending between the excitation winding and the field winding; and
    the end plate defines, within the end plate;
    a coolant channel radially inner segment extending, between the rotation axis and the excitation winding, a radially inner channel of the coolant channel segment fluidly terminating at the excitation winding; and
    a coolant channel radially outer segment extending between the excitation winding and the field winding, the excitation winding fluidly interposed between the radially outer segment and the rotation axis, wherein the coolant channel radially outer segment extends at least partially about the rotation axis with a circumferential component; and
  wherein an end turn pocket is defined on an axial face of the end plate, wherein an end turn of the excitation winding is fixed within the end turn pocket, the end turn pocket fluidly coupling the excitation winding end turn to the coolant channel radially inner and outer segments;

the method comprising:

introducing a liquid coolant into the inlet of the coolant channel;

flowing the liquid coolant radially outward and across an end turn of the excitation winding; and conducting heat from the excitation winding to the liquid coolant through the end turn of the excitation winding.

13. The method as recited in claim 12, wherein the liquid coolant is introduced into the inlet at a shaft supporting the rotor, the method further comprising:

flowing the liquid coolant through a rotating rectifier fixed in rotation relative to the rotor; and flowing the liquid coolant axially along the rotor to the outlet of the coolant channel at an end of the rotor opposite the excitation winding.

\* \* \* \* \*